United States Patent [19]
Hall

[11] Patent Number: 6,048,370
[45] Date of Patent: Apr. 11, 2000

[54] MONOAZO DYES CONTAINING A FLUOROSULPHONYL GROUP AND USE THEREOF

[75] Inventor: Nigel Hall, Greenmount Bury, United Kingdom

[73] Assignee: BASF Aktiengesellschaft, Ludwigshafen, Germany

[21] Appl. No.: 09/125,021

[22] PCT Filed: Dec. 16, 1996

[86] PCT No.: PCT/GB96/03094

§ 371 Date: Aug. 24, 1998

§ 102(e) Date: Aug. 24, 1998

[87] PCT Pub. No.: WO97/29155

PCT Pub. Date: Aug. 14, 1997

[30] Foreign Application Priority Data

Feb. 10, 1996 [GB] United Kingdom .................... 9602741

[51] Int. Cl.⁷ ........................................ D06P 5/00
[52] U.S. Cl. .................... 8/506; 8/922; 8/924; 534/734
[58] Field of Search ................................. 534/734; 8/506, 8/922

[56] References Cited

U.S. PATENT DOCUMENTS 5,739,299   4/1998   Hall .......................................... 534/734

FOREIGN PATENT DOCUMENTS

WO A 95
 20014   7/1995   WIPO .

Primary Examiner—Margaret Einsmann
Attorney, Agent, or Firm—Oblon, Spivak, McClelland, Maier & Neustadt, P.C.

[57] ABSTRACT

Monoazo dyes having formula (1)

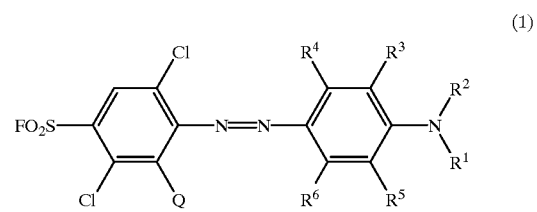

wherein Q is —Br or —Cl; $R^1$ and $R^2$ each independently is H or is selected from the group consisting of $C_{1-6}$-alkyl and aryl groups, each of which may be unsubstituted or substituted by one or more nonionic substituents; and $R^3$, $R^4$, $R^5$ and $R^6$ each independently is H, F, Cl, Br, I, —$SO_2F$ or an organic moiety selected from the group consisting of $C_{1-6}$-alkyl, $C_{1-6}$-alkoxy, $C_{1-4}$ alkanoylamino, —$NHSO_2$alkyl, —$NHCOC_{1-4}$alkyl and —Ophenyl moieties, each organic moiety being unsubstituted or substituted by one or more nonionic substituents are provided. The dyes can be employed for the colouring of synthetic textile material.

15 Claims, No Drawings

MONOAZO DYES CONTAINING A FLUOROSULPHONYL GROUP AND USE THEREOF

This invention relates to azo dyes and more particularly to water-insoluble monoazo dyes containing the fluorosulphonyl group, to a method for their prepharation and to their use for colouring synthetic textile and other materials.

Our International patent application published as WO 95/20014 describes azo compounds which contain at least one fluorosulphonyl group and are free from water-solubilising groups. The use of these compounds for colouring synthetic textile materials and for the mass coloration of plastics is also described.

It has now been found that certain dyes falling within the general class described in WO 95/20014 but not specifically disclosed therein exhibit advantageous properties when applied as disperse dyes to synthetic textile materials.

Thus, according to the invention, there are provided monoazo dyes which are free from water-solubilising groups and have the formula:

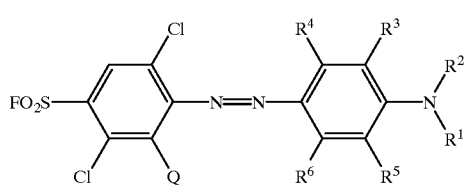

(1)

wherein:
  Q is —Br or —Cl;
  $R^1$ and $R^2$ each independently is H or is selected from the group consisting of $C_{1-6}$-alkyl and aryl groups, each of which may be unsubstituted or substituted by one or more nonionic substituents; and
  $R^3$, $R^4$, $R^5$ and $R^6$ each independently is H, F, Cl, Br, I, —$SO_2F$ or an organic moiety selected from the group consisting of $C_{1-6}$-alkyl, $C_{1-6}$-alkoxy, $C_{1-4}$ alkanoylamino, —$NHSO_2$alkyl, —$NHCOC_{1-4}$alkyl and -Ophenyl moieties, each organic moiety being unsubstituted or substituted by one or more nonionic substituents.

Water solubilising groups which must be absent from the dyes of Formula 1 particularly include —$SO_3H$, —$CO_2H$, —$PO_3H$ and quaternary ammonium groups and salts thereof.

When either or both of $R^1$ and $R^2$ represents a $C_{3-6}$ alkyl group, the alkyl group can be linear or branched, and when branched, the branching may form a secondary or tertiary group. One or two points of branching may be present. The C—N bond can be formed between the N atom and any carbon in $R^1$ or $R^2$.

When either or both of $R^1$ and $R^2$ represents an aryl a group, the aryl group may be phenyl or naphthyl group, which may be substituted at any position relative to the bond to the N atom. When either or both of $R^1$ and $R^2$ represents a phenyl group, any substituents are preferably present ortho and/or para to the phenyl- N bond. In certain embodiments, $R^1$ and $R^2$ may be fused to form, together with the N atom, an aromatic or conjugated heterocyclic group, particularly one comprising a 5 or 6 membered ring, or a saturated heterocyclic group, particularly one comprising a 5, 6 or 7 membered ring.

The optional nonionic substituents for groups represented by $R^1$ to $R^6$ particularly include —CN, —OH, —$OC_{1-6}$-alkyl, —$OCOC_{1-6}$-alkyl, —$COOC_{1-6}$-alkyl, phenyl, phenoxy, —OCOphenyl, —OCOphenyl$SO_2F$, phenyl$SO_2F$, —Ophenyl$SO_2F$, —$CO_2$phenyl$SO_2F$, —$COOC_{1-6}$-alkylOCOC$_{1-6}$-alkyl and —$COOC_{1-6}$-alkylCOOC$_{1-6}$-alkyl.

A preferred sub-group of the dyes of Formula 1 comprises compounds of the formula:

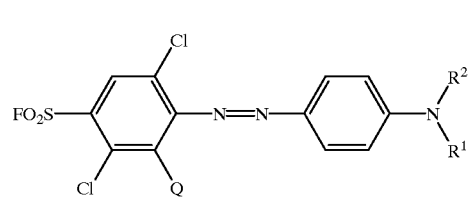

(2)

wherein Q is as defined above and each of $R^1$ and $R^2$, independently, is optionally substituted $C_{1-6}$-alkyl.

Within the sub-group of Formula 2, particular mention may be made of dyes in which each of $R^1$ and $R^2$ is optionally substituted ethyl, for exampie dyes in which $R^1$ is —$C_2H_5$ and $R^2$ is —$C_2H_4X$ wherein X is selected from —H, —CN, —$COOC_2H_5$, —$OCOCH_3$ and —$OC_6H_5$.

The dyes of Formula 1 may be prepared by diazotising 6-bromo-2,5-dichloro4-fluorosuiphonylaniline or 2,3,6-trichloro-4-fluorosulphonylaniline and coupling the resulting diazo compound with an aromatic amine of the formula:

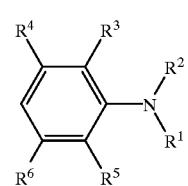

(3)

wherein $R^1$ to $R^6$ are as hereinbefore defined.

The diazotisation and coupling reactions may be performed using conditions conventionally employed for the type of reactant involved. Typically, the 6-bromo-2,5-dichloro4-fluorosulphonylaniline or 2,3,6-trichioro-4-fluorosulphonylaniline may be diazotised in an acidic medium, such as acetic, propionic or hydrochloric acid using a nitrosating agent such as nitrosylsulphuric acid, sodium nitrite or methyl nitrite at a temperature from −10° C. to 10° C. Coupling with the aromatic amine of Formula 3 may be achieved by adding the diazotised 6-bromo-2,5-dichloro-4-fluorosulphonylaniline or diazotised 2,3,6-trichloro4-fluorosulphonylaniline to the amine of Formula 3 in an alkanol such as methanol at a temperature from 0° C. to 10° C. After coupling, the compound of Formula 1 may be recovered from the reaction mixture by any convenient means such as by filtration.

The 6-bromo-2,5-dichloro-4-fluorosulphonylaniline and 2,3,6-trichloro-4-fluorosulphonylaniline, respectively, may be obtained by bromination or chlorination of 2, 5-dichloro-4-fluorosulphonylaniline.

The azo compounds of Formula 1 are useful as disperse dyes and are valuable for colouring synthetic textile materials and fibre blends containing such materials.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester, especially polyethylene terephthalate. Fibre blends may comprise mixtures of different synthetic textile materials or mixtures of synthetic and natural textile materials. Preferred fibre blends include those of polyester-cellulose such as polyester-cotton. The textile materials or blends thereof may be in the form of filaments, loose fibres, yarn or woven or knitted fabrics.

The azo compounds of Formula 1 or mixtures thereof, optionally in conjunction with other disperse dyes, may be applied to the synthetic textile materials or fibre blends thereof by processes which are conventionally employed in applying disperse dyes to such materials and fibre blends.

Suitable process conditions include the following:

i) exhaust dyeing at a pH of from 4 to 6.5, at a temperature of from 125° C. to 140° C. for from 10 to 120 minutes and under a pressure of from 1 to 2 bar, a sequestrant may be optionally added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 1 20° C. to 140° C. and 1 to 2 bar for from 10 to 45 minutes for pressure steaming, wetting agents and thickeners (such as alginates) of from 5 to 100% by weight of the dye may optionally be added;

iv) discharge printing (by padding the dye on to the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequestrates may optionally be added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants may optionally be added.

In all the above processes, the compound of Formula 1 or mixture thereof may suitably be applied as a dispersion comprising from 0.001% to 4% by weight of the azo compound or mixture thereof in aqueous medium.

The dye dispersions may further comprise ingredients conventionally used in coloration applications such as dispersing agents, for example lignosulphonates, naphthalene sulphonic acid/formaldehyde condensates or phenol/cresol/ sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the azo compound of Formula 1. Wetting agents may be used at from 0% to 20% on the weight of the azo compound of Formula 1.

Suitable dispersions may be prepared by bead milling the compound of Formula 1 with glass beads or sand in an aqueous medium.

The compounds of Formula 1 provide synthetic textile materials with yellow-brown colorations exhibiting good fastness to washing, light and heat.

The azo compounds of Formula 1 are also useful for the mass coloration of plastics materials. The azo compound is generally incorporated by blending with granular or powdered plastics material by, for example, dry tumbling or high speed mixing followed by injection moulding on a screw machine or by conventional compounding/masterbatching techniques. The present dyes generally dissolve or disperse rapidly in hot plastics melts and provide bright colorations generally with good clarity and good light fastness. Plastics which may be coloured in this way include polystyrene, acrylics, styrene/acrylonitrile mixtures, acrylonitrile/butadiene/styrene mixtures, polycarbonate, polyethersulphone, nylons, rigid PVC (uPVC) and polypropylene.

The azo compounds of Formula 1 may also be used as colorants for the inks used in solvent-based ink-jet printing processes. These inks, typically based on ketones and/or alcohols, are useful for printing on to hydrophobic substrates such as plastics and metals.

The invention is illustrated but not limited by the following Examples in which all parts are by weight unless otherwise indicated. All $\lambda$max were measured in $CH_2Cl_2$.

EXAMPLE 1

To a solution of 2,5-dichloro-4-fluorosulphonylaniline (4.9 parts) in acetic acid (30 parts) stirring at ambient temperature, was added a solution of bromine (3.52 parts) in acetic acid (10 parts). The mixture was stirred for 2 hours at 70° C., cooled to ambient temperature and water (75 parts) was added. After stirring for 1 hour, the product was isolated by filtration and dried to yield; 6-bromo-2,5-dichloro-4-fluorosulphonylaniline (6.0 parts).

To a mixture of 6-bromo-2,5-dichloro-4-fluorosulphonylaniline (2.6 parts) and acetic/propionic acid mixture (15 parts, 86/14 vol/vol), stirring at 0–5° C., was added dropwise nitrosylsulphuric acid solution (5 parts). The mixture was stirred at this temperature for a further 30 minutes.

The diazo solution was added slowly to a mixture of N,N-diethylaniline (1.2 parts), methanol (20 parts), water (10 parts) and sulphamic acid (0.5 part), stirring at 0–5° C. After stirring for 3 hours at this temperature, the product was isolated by filtration, washed with water and dried to yield 4-(6-bromo-2,5-dichloro-4-fluorosulphonylphenylazo)—N,N-diethylaniline (1.3 parts).

When applied to polyester materials from an aqueous dispersion, the dye gives yellow brown shades with excellent light fastness and excellent fastness to wet treatments. $\lambda$max=452 nm.

EXAMPLE 2

In place of N,N-diethylaniline (1.2 parts) in Example 1, there were used N-ethyl-N-(2-cyanoethyl)aniline (1.4 parts) to yield 4-(6-bromo-2,5-dichloro4-fluorosulphonyl phenylazo)-N-ethyl-N(2-cyanoethyl)aniline (1.6 parts). When applied to polyester materials from an aqueous dispersion, the dye gives yellow brown shades with excellent light fastness and excellent fastness to wet treatments. $\lambda$max=418 nm.

EXAMPLE 3

In place of N,N-diethylaniline (1.2 parts) in Example 1, there were used N-ethyl-N-(2-ethoxycarbonylethyl)aniline (1.5 parts) to yield 4-(6-bromo-2,5-dichloro-4-fluorosulphonylphenylazo)-N-ethyl-N-(2-ethoxycarbonylethyl)aniline (1.4 parts).

When applied to polyester materials from an aqueous dispersion, the dye gives yellow brown shades with excellent light fastness and excellent fastness to wet treatments. $\lambda$max=436 nm.

EXAMPLE 4

In place of N,N-diethylaniline (1.2 parts) in Example 1, there were used N-ethyl-N-(2-acetoxyethyl)aniline (1.4 parts) to yield 4-(6-bromo-2,5-dichloro4-fluorosulphonylphenylazo)-N-ethyl-N-(2-acetoxyethyl) aniline (1.3 parts). When applied to polyester materials from an aqueous dispersion, the dye gives yellow brown shades with excellent light fastness and excellent fastness to wet treatments. λmax=434 nm.

EXAMPLE 5

In place of N,N-diethylaniline (1.2 parts) in Example 1, there were used N-ethyl-N-(2-phenoxyethyl)aniline (1.7 parts) to yield 4-(6-bromo-2,5-dichloro-4-fluorosulphonyl phenylazo)—N-ethyl—N-(2-phenoxyethyl)aniline (1.8 parts). When applied to polyester materials from an aqueous dispersion, the dye gives yellow brown shades with excellent light fastness and excellent fastness to wet treatments. λmax=446 nm.

I claim:

1. A monoazo dye which is free from water-solubilizing groups and has the formula:

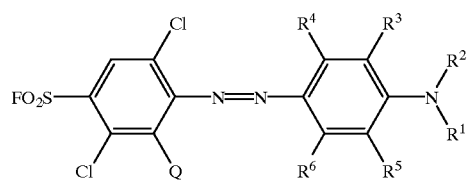
(1)

wherein:

Q is —Br or —Cl;

$R^1$ and $R^2$ each independently is H or is selected from the group consisting of $C_{1-6}$-alkyl and aryl groups, each of which is optionally substituted by one or more nonionic substituents; and $R^3$, $R^4$ and $R^5$ each independently is H, F, Cl, Br, I, —$SO_2F$ or an organic moiety selected from the group consisting of $C_{1-6}$-alkyl, $C_{1-6}$-alkoxy, $C_{1-4}$-alkanoylamino, —$NHSO_2$ alkyl, —$NHCOC_{1-4}$ alkyl, and -O-phenyl m oieties, each organic moiety being optionally substituted by one or more nonionic substituents.

2. The monoazo dye according to claim 1, wherein each of $R^1$ and $R^2$, independently, is $C_{1-6}$-alkyl which ioponlysubstituted by one or more nonionic substituents and each of $R^3$, $R^4$, $R^5$ and $R^6$ is H.

3. The monoazo dye according to claim 2, wherein each of $R^1$ and $R^2$ is ethyl which is optionally substituted by one or more nonionic substituents.

4. The monoazo dye according to claim 3, wherein $R^1$ is —$C_2H_5$; and $R^2$ is —$C_2H_4X$, wherein X is selected from the group consisting of —H, —CN, —$COOC_2H_5$, —$OCOCH_3$ and —$OC_6H_5$.

5. A method for the preparation of a monoazo dye according to claim 1 which comprises diazotising 6-bromo-2,5-dichloro-4-fluorosulphonylaniline or 2,3,6-trichloro-4-fluorosuiphonylaniline and coupling the resulting diazo compound with an aromatic amine of the formula:

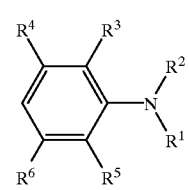
(3)

wherein $R^1$ to $R^6$ are as defined in claim 1.

6. A process for coloring a synthetic textile material or a fiber blend thereof which comprises applying thereto a monoazo dye according to claim 1.

7. A process for the mass coloration of plastic materials, which comprises incorporating into a plastics material a monoazo dye according to claim 1.

8. The monoazo dye according to claim 1, wherein said non-ionic substituents for $R^1$ to $R^6$ are —CN, —OH, $OC_{1-6}$ alkyl, —$OCOC_{1-6}$-alkyl, —$COOC_{1-6}$-alkyl, phenyl, phenoxy, —OCO-phenyl, —OCO-phenyl-$SO_2F$, —O-phenyl-$SO_2F$, —$CO_2$-phenyl-$SO_2F$, —$COOC_{1-6}$-alkyl, —$OCOC_{1-6}$-alkyl, or —$COOC_{1-6}$-alkyl-$COOC_{1-6}$-alkyl.

9. The monoazo dye according to claim 1, which is 4-(6-bromo-2,5-dichloro-4-fluorosulphonylphenylazo)-N, N-diethylaniline.

10. The monoazo dye according to claim 1, which is 4-(6-bromo-2,5-dichloro-4-fluorosulphonylphenylazo)-N-ethyl-N(2-cyanoethyl)aniline.

11. The monoazo dye according to claim 1, which is 4-(6-bromo-2,5-dichloro-4-fluorosulphonylphenylazo)-N-ethyl-N-(2-ethoxycarbonylethyl)aniline.

12. The monoazo dye according to claim 1, which is 4-(6-bromo-2,5-dichloro-4-fluorosulphonylphenylazo)-N-ethyl-N-(2-acetoxyethyl)aniline.

13. The monoazo dye according to claim 1, which is 4-(6-bromo-2,5-dichloro-4-fluorosulphonylphenylazo)-N-ethyl-N-(2-phenoxyethyl)aniline.

14. The process according to claim 5, wherein said diazotizing is effected in acidic medium with a nitrosating agent at a temperature of from –10° C. to 10° C.

15. The process according to claim 5, wherein said coupling is effected by adding diazotized 6-bromo-2,5-dichloro-4-fluorosulfonylaniline or 2,3,6-trichloro-4-fluorosulfonylaniline to the amine of the formula (3) in an alkanol at a temperature of from 0° C. to 10° C.

* * * * *